US010775151B2

(12) United States Patent
Gutierrez Bravo et al.

(10) Patent No.: US 10,775,151 B2
(45) Date of Patent: Sep. 15, 2020

(54) DISTANCE DETERMINATION

(71) Applicant: HEWLETT-PACKARD DEVELOPMENT COMPANY, L.P., Houston, TX (US)

(72) Inventors: Mauricio Ernesto Gutierrez Bravo, Palo Alto, CA (US); Rajat Sandeshkumar Anand, Palo Also, CA (US); Robert Campbell, Palo Alto, CA (US); Jay Sheth, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/095,692

(22) PCT Filed: Apr. 22, 2016

(86) PCT No.: PCT/US2016/028939
§ 371 (c)(1),
(2) Date: Oct. 22, 2018

(87) PCT Pub. No.: WO2017/184172
PCT Pub. Date: Oct. 26, 2017

(65) Prior Publication Data
US 2019/0128660 A1 May 2, 2019

(51) Int. Cl.
*G01B 11/02* (2006.01)
*G01S 17/08* (2006.01)
(Continued)

(52) U.S. Cl.
CPC ............ *G01B 11/02* (2013.01); *G01J 5/0022* (2013.01); *G01S 11/12* (2013.01); *G01S 17/08* (2013.01); *G01S 17/86* (2020.01)

(58) Field of Classification Search
None
See application file for complete search history.

(56) References Cited

U.S. PATENT DOCUMENTS 5,971,597 A 10/1999 Baldwin et al.
5,995,206 A * 11/1999 Morinaka ............ G01S 7/4813
356/4.01
(Continued)

FOREIGN PATENT DOCUMENTS

CN 102203701 9/2011
CN 102472669 5/2012
(Continued)

OTHER PUBLICATIONS

Keller, H.J. et al., Advanced Passive Infrared Presence Detectors as Key Elements in Integrated Security and Building Automation Systems, Oct. 13-115, 1993.

*Primary Examiner* — Hoon K Song
(74) *Attorney, Agent, or Firm* — Brooks Cameron & Huebsch PLLC (57) ABSTRACT

In an example, distance determination can utilize an electronic device including an infrared sensor to detect a thermal signature of a subject at a first location and a thermal signature of the subject at a second location, a distance sensor to determine a distance of the subject at the first location from the electronic device, and a controller to determine a physical size based on the determined distance and the thermal signature of the subject at the first location, and determine a distance of the subject at a second location based on the physical size and a thermal signature of the subject at the second location.

14 Claims, 4 Drawing Sheets

(51) Int. Cl.
   *G01S 11/12*   (2006.01)
   *G01J 5/00*   (2006.01)
   *G01S 17/86*   (2020.01)

(56) References Cited

U.S. PATENT DOCUMENTS

| | | |
|---|---|---|
| 6,288,395 B1 | 9/2001 | Kuhnly et al. |
| 6,800,854 B2 | 10/2004 | Pfister et al. |
| 6,967,674 B1 * | 11/2005 | Lausch .............. G06K 9/00771 |
| | | 348/143 |
| 8,805,302 B2 | 8/2014 | Pantfoerder |
| 8,963,088 B2 | 2/2015 | Barlow et al. |
| 9,223,353 B2 | 12/2015 | Calataylid et al. |
| 2012/0050189 A1 | 3/2012 | Choboter et al. |
| 2014/0326887 A1 | 11/2014 | Barlow et al. |

FOREIGN PATENT DOCUMENTS

| | | |
|---|---|---|
| CN | 103250037 | 8/2013 |
| CN | 105229582 | 1/2016 |
| JP | 3328500 | 12/1996 |
| JP | 2005037366 | 2/2005 |
| KR | 1020130101566 | 9/2013 |

* cited by examiner

DISTANCE DETERMINATION

BACKGROUND

An infrared sensor may detect electromagnetic radiation in the infrared region of the electromagnetic spectrum. For example, the infrared region may include electromagnetic radiation with a wavelength greater than about 700 nanometers and a wavelength less than about 1 millimeter. An infrared sensor may detect electromagnetic radiation in all of the infrared region or a portion of the infrared region.

DETAILED DESCRIPTION

An infrared sensor may be employed to detect a presence of a subject. For example, an infrared sensor may detect a thermal signature of a subject. However, a thermal signature detected by an infrared sensor may not provide an accurate size of the subject and/or an accurate distance measurement of the subject from the infrared sensor. For example, the same thermal signature could denote either be a small object at a close range or a large object farther away.

Distance determination, in an example, can utilize an electronic device including an infrared sensor to detect a thermal signature of a subject at a first location and a thermal signature of the subject at a second location, a distance sensor to determine a distance of the subject at the first location from the electronic device, and a controller to determine a physical size based on the determined distance and the thermal signature of the subject at the first location, and determine a distance of the subject at a second location based on the physical size and a thermal signature of the subject at the second location. As used herein, a thermal signature refers to an amount of infrared light emitted by a subject.

Notably, distance determination, in contrast to other approaches, can distinguish between a small object that is close to an infrared sensor and a comparatively larger object that is farther away from the infrared sensor. In addition, distance determination can identify a particular subject, as described herein, and can tailor a response of the electronic device to the particular subject. For example, the electronic device can save power by turning on a display included in the electronic device when a particular subject is close enough to see and/or interact with the display. In some examples, the electronic device can display content relevant to a particular subject, among other possibilities. Examples of content relevant to the particular subject include personalized content such as news, email (e.g., enterprise email and/or personal email accounts of the particular subject, etc.).

Figure 1:
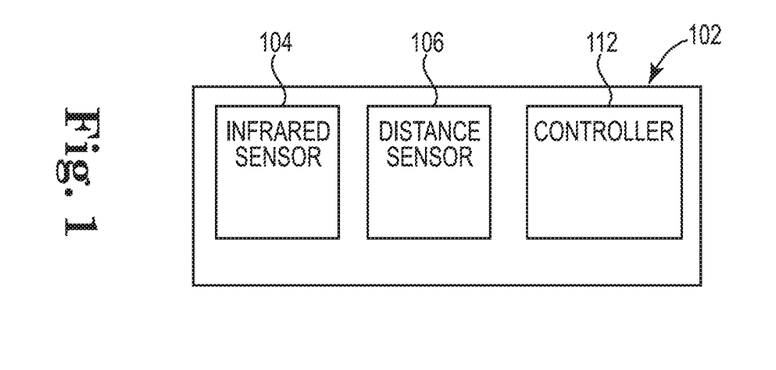
FIG. 1 illustrates an example of an electronic device for distance determination according to the disclosure.

FIG. 1 illustrates an example of an electronic device for distance determination according to the disclosure. As illustrated in FIG. 1, the electronic device 102 can include an infrared sensor 104, a distance sensor 106, and a controller 112. In some examples, the electronic device can include a temperature sensor and/or a light sensor, as described herein.

As used herein, an infrared sensor refers to an electronic device that can detect a thermal signature of the subject (i.e., infrared light radiating and/or reflected from the subject) within a field of view of the infrared sensor 104. As used herein, a subject refers to a human, object, and/or other type of entity that radiates and/or reflects infrared light.

Examples of infrared sensors include passive infrared sensors and/or active infrared sensors, among others types of infrared sensors. For instance, in some examples, the infrared sensor 104 can be a passive infrared (PIR) sensor including a PIR thermocouple, among other suitable types of infrared sensors.

The distance sensor 106 refers to an electronic device that can measure a distance of a subject from the distance sensor. Examples of distance sensors include time of flight sensors, laser rangefinders, and/or LIDAR, among others types of distance sensors. For instance, in some examples, the distance sensor 106 can be a time of flight sensor. The distance sensor can determine a distance of the subject, as described herein.

Figure 2:
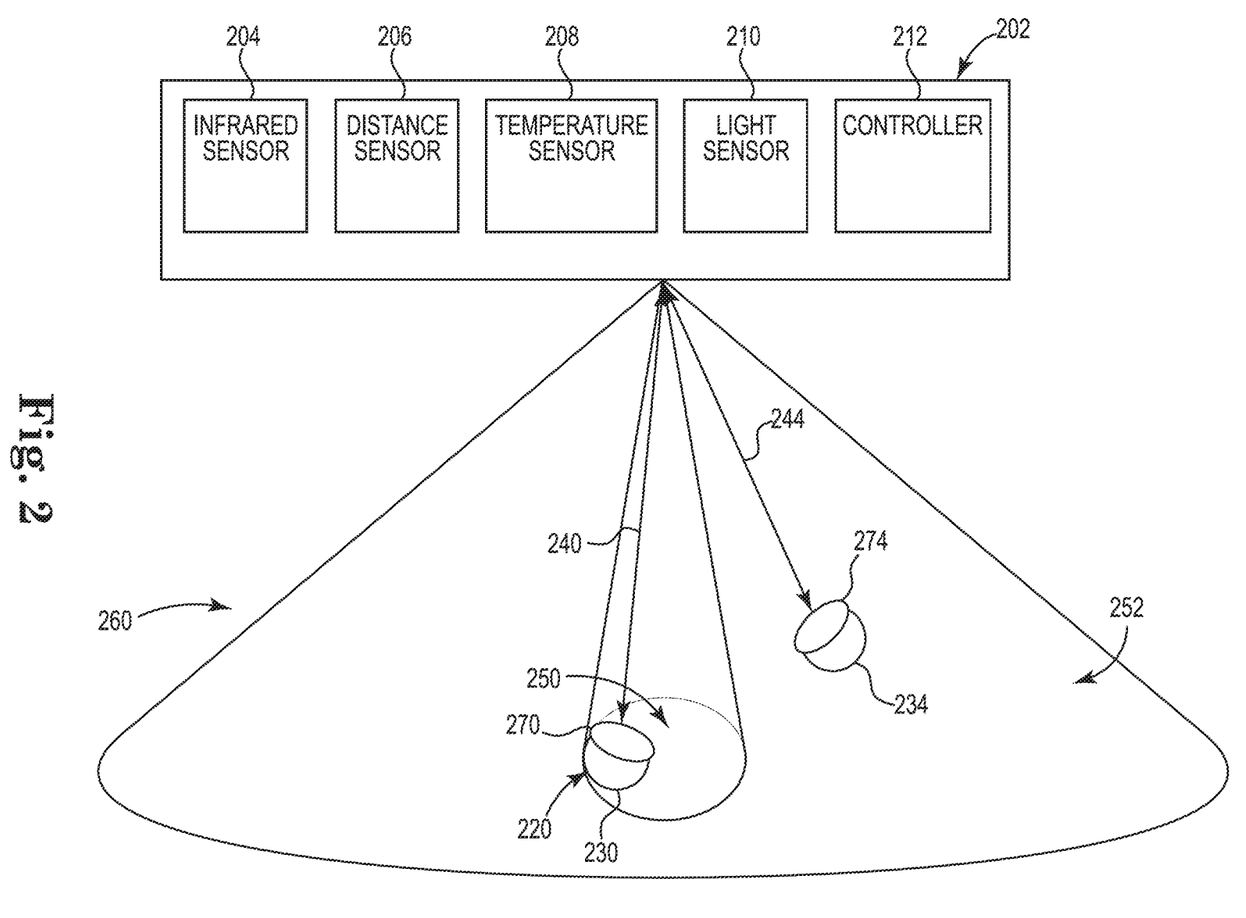
FIG. 2 illustrates an example of an environment with an electronic device for distance determination according to the disclosure.

FIG. 2 illustrates an example of an environment 260 with an electronic device 202 for distance determination according to the disclosure. As illustrated in FIG. 2, the electronic device 202 can include an infrared sensor 204, a distance sensor 206, a temperature sensor 208, a light sensor 210, and a controller 212.

As mentioned, in various examples, the infrared sensor 204 can detect a thermal signature of a subject. For example, the infrared sensor 204 can detect a thermal signature of a subject at a first location such as first location 230 and can detect a thermal signature of the subject at a second location such as second location 234. It is noted that a thermal signature of a subject can vary. For instance, a thermal signature can vary based upon a relative distance of the subject to the infrared sensor 204. For example, a thermal signature of a subject at the first location 230 can be different (e.g., smaller than) than a thermal signature of the subject at the second location 234.

The infrared sensor 204 can detect a subject within a field of view 252 of the infrared sensor. As used herein, a field of view refers to an area within which the infrared sensor 204 can detect a thermal signature of a subject.

In some examples, the infrared sensor 204 can detect a first thermal signature 270 of a first subject 220 at a first location 230. Similarly, the infrared sensor 204 can detect a second thermal signature of another subject (not shown) within the field of view 250 of the infrared sensor 204, for example, another subject at the second location 234. Each of the subjects can have a respective thermal signature. A respective thermal signature can be associated with a particular subject and/or promote identification of a particular subject, as described herein.

As mentioned, the distance sensor 206 can detect a subject within a field of view 250 of the distance sensor 206. As illustrated in FIG. 2, the field of view 250 of the distance sensor 206 can be included within (i.e., encompassed by) the field of view 252 of the infrared sensor 204. In various examples, the distance sensor 206 can determine a distance 240 of the subject within the distance sensor's field of view 252, as described herein.

The field of view 252 of the infrared sensor 204 can be larger than the field of view 252 of the distance sensor 206. For example, the field of view 252 of the infrared sensor 204 can be 90 degrees wide while the field of view 250 of the distance sensor 206 can be 15 degrees wide, among other possible values of the field of view 252 of the infrared sensor 204 and/or the field of view 250 of the distance sensor 206.

It is noted that the infrared sensor 204 having the field of view 252 as illustrated in FIG. 2 can measure a second thermal signature 274 of a subject at a second location 234, while the distance sensor 206 when oriented with the field of view 250 as illustrated in FIG. 2 cannot measure a second distance 244 of the subject at the second location 234 to the distance sensor 206. However, distance determination can desirably determine a distance of the subject at the second location using the infrared sensor 204.

The distance sensor 206 can measure a distance 240 of the first subject 220 at the first location330. The distance sensor 206 can measure the distance 240 prior to, at the same time, and/or following the infrared sensor 204 measuring the thermal signature 270. For instance, in some examples, the distance sensor can measure the distance 240 of the first subject 220 at the first location 230 in response to the infrared sensor 204 measuring the first thermal signature 270 of the first subject 220 at the first location 230.

A thermal signature of a particular subject can vary. For example, a thermal signature of a particular subject can vary based on environmental variables such as an ambient temperature of an environment (e.g., a room) the particular subject is in, an amount of light (e.g., ambient light) such as sunlight in the environment, and/or a heat source in the environment, among other possible variables that can cause a thermal signature to vary.

In some examples, detecting distances can account for and/or mitigate effects of environmental variables that can cause a thermal signature to vary. For example, a course calibration of the infrared sensor can be performed, as described herein, based on a reading of the temperature sensor 208 and/or a reading of the light sensor 210. In this manner, environmental variables such as an ambient temperature and/or an amount of ambient light can be accounted for and/or mitigated thereby producing an accurate thermal signature from the infrared sensor 204 and/or an accurate distance measurement from the distance sensor 206. In some examples, a course calibration can be performed using on a long-term average of detected temperatures and/or a long-term average of amounts of detected ambient light to mitigate and/or eliminate fluctuations (e.g., noise) associated with a detected temperature and/or an amount of ambient light.

For example, the temperature sensor 208 can detect an ambient temperature of the environment 260. Examples of temperature sensors include various thermometers, among other possible types of temperature sensors. The light sensor 210 can detect an amount of ambient light in the environment 260. Examples of light sensors include various types of photodetectors, among other possibilities. As mentioned, a thermal signature detected by the infrared sensor 204 can be altered to account for the amount of ambient light and/or an ambient temperature of the environment 260. Such alteration can be facilitated by the controller 212 and/or a look-up table, as described herein.

The controller 212 can, in various examples, determine a physical size of a subject and can determine a distance of the subject at a second location based on the physical size and a thermal signature of the subject at the second location, as described herein.

Figure 3:
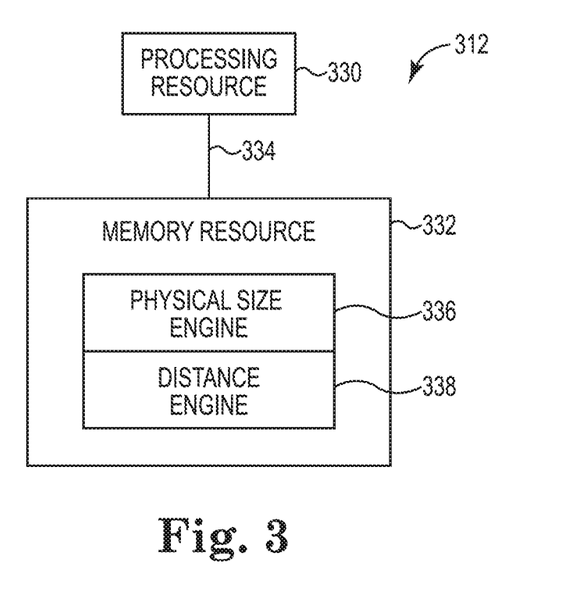
FIG. 3 illustrates a diagram of an example of a controller for distance determination according to the disclosure.

FIG. 3 illustrates a diagram of an example of a controller 312 for distance determination according to the disclosure. For example, the controller 312 can be a combination of hardware and instructions for distance determination. The hardware, for example can include a processing resource 330 and/or a memory resource 332 (e.g., computer-readable medium (CRM), data store, etc.)

The processing resource 330, as used herein, can include a number of processors capable of executing instructions stored by a memory resource 332. Processing resource 330 can be integrated in a single device or distributed across multiple devices. The instructions (e.g., computer-readable instructions (CRI)) can include instructions stored on the memory resource 332 and executable by the processing resource 330 to implement a desired function (e.g., determine, etc.).

The memory resource 332, as used herein, can include a number of memory components capable of storing non-transitory instructions that can be executed by processing resource 330. Memory resource 332 can be integrated in a single device or distributed across multiple devices. Further, memory resource 332 can be fully or partially integrated in the same device as processing resource 330 or it can be separate but accessible to that device and processing resource 330. Thus, it is noted that the controller 312 can be implemented on an electronic device and/or a collection of electronic devices, among other possibilities.

The memory resource 334 can be in communication with the processing resource 330 via a communication link (e.g., path) 334. The communication link 334 can be local or remote to an electronic device associated with the processing resource 330. Examples of a local communication link 334 can include an electronic bus internal to a computing device where the memory resource 332 is one of volatile, non-volatile, fixed, and/or removable storage medium in communication with the processing resource 330 via the electronic bus.

The memory resource 332 includes a number of engines (e.g., a physical size engine 336, and a distance engine 338, etc.). The memory resource 332 can include additional or fewer engines than illustrated to perform the various functions described herein.

The number of engines can include a combination of hardware and instructions to perform a number of functions described herein (e.g., determine a distance, etc.). The instructions (e.g., software, firmware, etc.) can be downloaded and stored in a memory resource (e.g., computer-readable medium) as well as a hard-wired program (e.g., logic), among other possibilities.

The physical size engine 336 can determine a physical size of the subject. In various examples, a determined physical size can be based on the distance of the subject at the first location from the distance sensor and the thermal signature of the subject at the first location.

For example, an infrared sensor can detect a thermal signature of a subject as represented by a digital count. As used herein, a digital count is a digital representation of an amount of infrared radiation detected by the infrared sensor (e.g., when the subject is at a first location within a field of view of the infrared sensor). In various examples, a distance sensor can detect a distance (e.g., 100 centimeters) of the subject at the first location (a distance from an electronic device including the distance sensor and/or the infrared sensor to the first location).

In such examples, the thermal signature and/or the distance can be correlated to a physical size of a subject included in an association and/or a mapping such as a look up table. For instance, a look-up table including various thermals signatures, distances, and corresponding physical sizes can be referenced by the controller 312 to determine a physical size of the subject. For example, a look-up table can include values of thermal signatures (e.g., a unitless value such as 64630) and distances (e.g., 100 centimeters) that correspond to a physical size of the subject (e.g., six feet tall). While look-up tables can be used to determine the physical size of the subject, the disclosure is not so limited. Instead, various other manners of determining a physical size of the subject at the second location based upon a thermal signature of the subject at a first location and a distance of the subject at the first location can be employed. For instance, a distance of a subject at the second location can be a mathematical function of the physical size of the subject and the thermal signature of the subject at the second location, among other possibilities.

Additionally, while such examples describe physical size in terms of height, the disclosure is not so limited. Rather other dimensions and/or combination thereof (e.g., width, area, etc.) can be utilized to promote aspects of distance determination. For instance, in some examples, the physical size of a subject can refer to an area within the field of view of the infrared sensor that the subject occupies.

In some example, the look-up table can include information on an ambient temperature and/or an amount of ambient light that can be utilized to determine a physical size of the subject. For example, course calibration can alter (increase or decrease) a value of a thermal signature based on an amount of ambient light (e.g., detected by a light sensor) and/or an ambient temperature (e.g., detected by a temperature to account for and/or mitigate effects of changes in an ambient amount of light and/or changes in ambient temperature. Such course calibration can be performed in accordance with a look-up table including values of ambient temperature, ambient light, and corresponding adjustments of a thermal signature, among other possibilities.

In some examples, the controller 312 can determine the distance of the subject at the second location as a function of the physical size of the subject and the thermal signature of the subject at the second location. The physical size can be determined from a look-up table based on the determined distance and the thermal signature of the subject at the first location, as described above. The infrared sensor can, in various examples, detect a thermal signature of the subject at the second location. The controller 312 can determine the distance of the subject at the second location based on the thermal signature of the subject at the second location and the physical size of the subject.

The distance engine 338 can determine a distance of the subject at a second location based on the determined physical size of the subject and a thermal signature of the subject at the second location. That is, while the second location may be outside a field of view of a distance sensor, determining distance can desirably utilize the thermal signature of the subject at the second location and the previously determined sized of the subject to determine a distance of the subject at the second location. For example, a lookup-table including values of thermal signatures, distances, and sizes of subjects can be referenced by the controller 312 to determine the distance of the subject at the second location. For instance, a particular thermal signature and a particular size of the subject can correspond to a particular distance (e.g., seven feet) in a look-up table.

That is, as mentioned, the controller 312 can include and/or reference a look-up table. The look-up table can be stored in the memory resource 332, and/or the controller 312 can reference a look-up table stored elsewhere. The look-up table can include detected values from the infrared sensor, the distance sensor, the temperature sensor, the light sensor, and/or determined physical sizes of subjects, among other information.

In some examples, values included in the look-up table and/or values based on values in the look-up table can modified to account for ambient light and temperature changes. For example, values in the look-up table can be modified based on based on a reading of the temperature sensor and/or light sensor, among other possibilities.

In some examples, the controller 312 can include instructions to identify the subject as a particular subject based on the determined physical size of the subject. For example, a determined physical size can be compared to known physical sizes (determined physical sizes and/or those input by a user). Based on the comparison, the determined physical size may or may not be match (e.g., within +/−3%) a known physical size such as those included in a look-up table. When the determined size is a match, the identity of the subject having the determined physical size is associated with the identify of a subject having the known physical size. The controller can display content relevant to a particular subject (e.g., a subject having a known physical size). In some examples, when the determined size is not a match, the subject having the determined physical size can be stored in the look-up table.

As mentioned, the controller 312 can, in some examples, include instructions to display content relevant to a particular subject. For example, the controller 312 can display content relevant to a particular subject in response to the controller 312 identifying the subject as a particular subject based on the determined physical size of the subject. For example, the controller 312 may cause a display such a graphical user interface of the electronic device in which the controller 312 is included to display an image associated with the subject and/or display content of programs (e.g., email) associated with the subject, among other possibilities.

In some examples, the controller 312 can modify aspects of the displayed content based on the determined distance of the subject at the second location. For example, a font size of the displayed content can be modified based on the determined distance of the subject at the second location. In some examples, a font size can be increased if the determined distance at the second location is greater than the distance at the first location (e.g., to promote of readability of displayed content as the subject moves away from the electronic device). Similarly, the controller 312 can modify a volume up/down and/or enlarge (e.g., zoom in) and/or reduce (e.g., zoom out) a relative size of displayed content based on the determined distance of the subject at the second location, among other possibilities.

The controller 312 can, in some examples, designate areas surrounding the electronic device including the controller 312 as particular zones. For example, the controller 312 can designate several different zones at varying concentric distances from the electronic device including the controller 312. Such zones can be used to promote aspects of distance determination such as the controller 312 modifying display parameters depending on which zone of a plurality of different zones a subject is located in.

For example, the controller 312 can designate three zones. Zone one can be from 0-3 feet concentrically away from the electronic device, zone two can be from 4-8 feet concentrically away from the electronic device, and zone three can be from 9-12 feet concentrically away from the electronic device. However, a total number and/or respective values corresponding thereto can be varied. In such examples, font, among other display parameters can be varied. For instance, in zone one a font size could be 12 point, in zone two a font size could be 18 point, and in zone three a font size could be 26 point.

In some examples, bounds of a zone (e.g., 0-3 feet) can be based on a measured distance of a subject from the distance sensor. For example, the distance sensor can measure a distance of a subject (e.g., two feet) and a zone can be designated that includes the measured distance of the subject (e.g., 0-3 feet).

The controller 312 can, in some examples, include instructions to cease display of content to the particular subject when the particular subject exits a field of view of the infrared sensor. For example, when the controller 312 detects and/or determines a physical size of a subject within a field of view of an infrared the controller 312 can prompt a display of electronic device to display content (e.g., content relevant to the subject). In such examples, when the subject exits the field of view of the infrared sensor the controller can cause the electronic device to cease display of the content.

Figure 4:
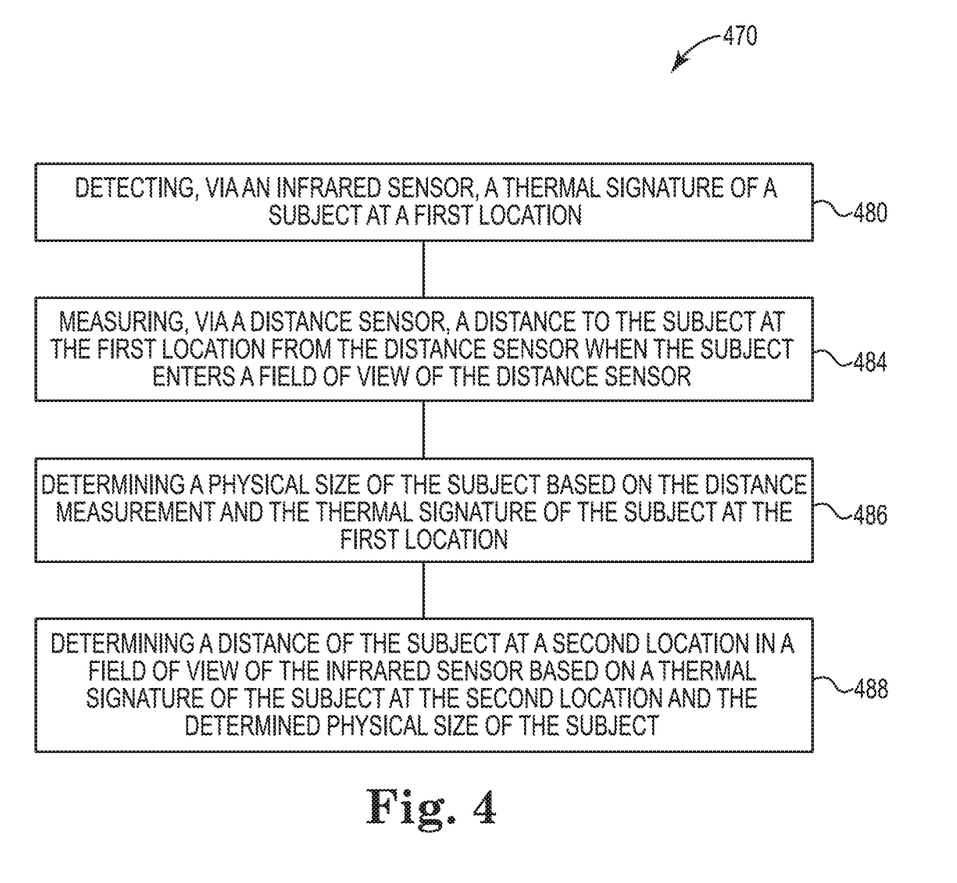
FIG. 4 illustrates a flow diagram of an example of a method for distance determination according to the disclosure.

FIG. 4 illustrates a flow diagram of an example of a method 470 for distance determination according to the disclosure. As illustrated at 480, the method 470 can include detecting, via an infrared sensor, a thermal signature of a subject at a first location, as described herein.

The method 470 can include detecting, via an infrared sensor, a thermal signature of a subject at a first location, as illustrated at 480. In some example, the method 470 can include detecting a distance of a subject each time the subject enters the field of view of the distance sensor. However, the disclosure is not so limited. Rather, a distance to a subject from the distance sensor can be detected periodically, in response to a user input, and/or when a subject with a thermal signature does not match a known thermal signature, among other possibilities.

As illustrated at 484, the method 470 can include measuring, via a distance sensor, a distance from the distance sensor to the subject at the first location when the subject enters a field of view of the distance sensor, as described herein. As illustrated at 486, the method 470 can include determining a physical size of the subject based on the distance and the thermal signature, as described herein. The method 470 can include determining a distance from the infrared sensor to the subject at a second location in a field of view of the infrared sensor based on a thermal signature of the subject at the second location and the determined physical size of the subject, as illustrated at 388.

In some examples, the method 470 can include displaying, via a graphical user interface, content relevant to a particular subject. For instance, content relevant to the particular subject can be displayed when the particular subject is within a field of view of the infrared sensor. In such examples, the electronic device can cease display of content relevant to the particular subject when the particular subject is no longer within the field of view of the infrared sensor and/or cease displaying content relevant to the particular subject when another subject enters the field of view of the infrared sensor, among other possibilities.

In some examples, the second location, as described herein, can be outside a field of view of the distance sensor. However, distance determination as described herein can notably determine the distance of the subject at the second location without using a distance sensor. For instance, the method 470 can include determining a distance from the infrared sensor to the subject at a second location in a field of view of the infrared sensor (but outside the field of view of the distance sensor) based on a thermal signature of the subject at the second location and the determined physical size of the subject without using a distance sensor.

The figures herein follow a numbering convention in which the first digit corresponds to the drawing figure number and the remaining digits identify an element or component in the drawing. For example, reference numeral 112 can refer to element "12" in FIG. 1 and an analogous and/or identical element can be identified by reference numeral 212 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

It is understood that when an element is referred to as being "on," "connected to", "coupled to", or "coupled with" another element, it can be directly on, connected to, or coupled with the other element or intervening elements can be present. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

What is claimed:

1. An electronic device, comprising:
   an infrared sensor to detect a thermal signature of a subject at a first location and a thermal signature of the subject at a second location, wherein the first location and the second location are different;
   a distance sensor to determine a distance of the subject at the first location from the electronic device; and
   a controller to:
      determine a physical size based on the determined distance and the thermal signature of the subject at the first location; and
      determine, without a distance sensor, a distance of the subject at the second location based on the determined physical size of the subject and a thermal signature of the subject at the second location.

2. The electronic device of claim 1, wherein the controller is to determine the distance of the subject at the second location as a function of the physical size of the subject and the thermal signature of the subject at the second location.

3. The electronic device of claim 1, wherein the distance sensor is a time of flight sensor and the infrared sensor is a passive infrared sensor.

4. The electronic device of claim 1, wherein the controller includes a look-up table, and wherein the look-up table stores the determined physical size.

5. The electronic device of claim 1, wherein a field of view of the infrared sensor is larger than a field of view of the distance sensor.

6. A controller comprising a processing resource in communication with a memory resource including instructions to:
   determine a physical size of a subject based on a distance of the subject at a first location from a distance sensor and a thermal signature of the subject at the first location; and
   determine, without a distance sensor, a distance of the subject at a second location based on the determined physical size of the subject and a thermal signature of the subject at the second location, wherein the first location and the second location are different.

7. The controller of claim 6, including instructions to identify the subject as a particular subject based on the physical size of the subject.

8. The controller of claim 7, including instructions to display content via a graphical user interface of an electronic device.

9. The controller of claim 8, including instructions to display content relevant to the particular subject.

10. The controller of claim 9, including instructions to cease display content to the particular subject when the particular subject exits a field of view of the infrared sensor.

11. A method, comprising:
- detecting, via an infrared sensor, a thermal signature of a subject at a first location;
- measuring, via a distance sensor, a distance from the distance sensor to the subject at the first location when the subject enters a field of view of the distance sensor;
- determining a physical size of the subject based on the distance and the thermal signature; and
- determining, without using a distance sensor, a distance from the infrared sensor to the subject at a second location in a field of view of the infrared sensor based on a thermal signature of the subject at the second location and the determined physical size of the subject, wherein the first location and the second location are different.

12. The method of claim 11, wherein the method includes monitoring an ambient air temperature and an amount of ambient light associated with the thermal signature of the subject at the first location.

13. The method of claim 12, wherein determining the distance to the subject at the second location is based on:
- the thermal signature of the subject at the second location; and
- the determined physical size of the subject at the first location, the ambient air temperature at the first location, and the amount of ambient light at the first location.

14. The method of claim 12, wherein the second location is outside a field of view of the distance sensor.

* * * * *